Patented Jan. 22, 1952

2,583,112

UNITED STATES PATENT OFFICE 2,583,112

PROCESS FOR THE OXIDATION OF ACETALS TO ACIDS

Charles H. McKeever, Glenside, Pa., assignor to Rohm & Haas Company, Philadelphia, Pa., a corporation of Delaware No Drawing. Application December 22, 1950, Serial No. 202,426

8 Claims. (Cl. 260—413)

This invention relates to an improved process for converting acetals to acids. It relates to a process wherein an acetal is directly oxidized by free oxygen to an acid in the presence of formic acid as a solvent for the reaction mixture. The reaction which takes place in this process is represented by the following:

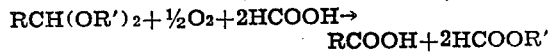
RCH(OR')$_2$ + ½O$_2$ + 2HCOOH → RCOOH + 2HCOOR' wherein R' represents a methyl or ethyl group and R represents an inert organic radical, preferably a hydrocarbon radical. By this process the yields are very high and the acid which is formed is most readily purified as will be further discussed below.

It is well known that acetals can be converted to aldehydes by hydrolysis in acid media, particularly in the presence of mineral acids. The products are, of course, aldehydes and alcohols. And it is further known that aldehydes can be oxidized to the corresponding acids. When, however, attempts have been made to convert acetals directly to acids, without going through the costly step of isolating and purifying the intermediate aldehydes, the final acids have invariably been contaminated by large quantities of esters which resulted from the esterification of the acids with the alcohols formed in the hydrolysis step.

This invention eliminates the contamination of the final acid with its ester and produces acids rapidly and smoothly in high yields directly from the acetals. Another feature of this process is that the amount of free aldehyde is never large because it is oxidized to the acid just about as fast as it is formed from the acetal. This is particularly advantageous in the case of highly reactive aldehydes because the formation of aldehyde condensation products is prevented. This is a particularly efficient process to use in conjunction with the oxo process wherein an olefin is converted to an acetal by reaction with carbon monoxide and hydrogen in the presence of methyl or ethyl alcohol and a cobalt catalyst.

The role of formic acid in the instant process is unique. While it serves as a solvent and while it does bring about the hydrolysis of the acetal, it does not catalyze the esterification of the final acid and the alcohol but, instead, itself reacts with the methyl or ethyl alcohol to form methyl or ethyl formate which volatilizes from the reaction mixture during the formation of the desired acid or on subsequent heating. Thus, its role is that of solvent and reactant and its uniqueness becomes more evident from a consideration of the examples below.

In this process the acetal is dissolved in formic acid and oxygen is bubbled through the solution. The reaction can be conducted at temperatures from 0° C. to 100° C. but a preferred range is from about 5° C. to about 50° C. At temperatures above about 20° C. the low-boiling methyl and ethyl formates are largely removed by the passage of the oxygen through the solution and can easily be trapped and recovered. The process operates well at subatmospheric and superatmospheric pressure but preferred pressures are those from —5 to +15 pounds per square inch. Although the use of a catalyst is not essential, it is recommended that one be used. The catalyst should be one which is soluble in the solution of acetal and formic acid, such as a salt of an organic acid and of a heavy metal such as cobalt, lead, or manganese.

The following is typical of how this process is carried out: To a flask, equipped with a mechanical agitator, a condenser, and a gas-dispersion tube, was charged 75 ml. of the dimethyl acetal of 3,5,5-trimethyl hexaldehyde, 75 ml. of 90% formic acid, and 0.05 g. of cobalt acetate. Agitation was begun and oxygen was passed through the mixture at room temperature. After one minute the solution turned green and there occurred an exothermic reaction. The temperature was maintained at 25°–35° C. by intermittent external cooling. The gas leaving the reaction mixture was passed through a trap cooled to —15° C. After two hours the exothermic reaction had subsided but the mixture was stirred at room temperature for an additional half-hour. The reaction mixture was then diluted with water and the organic layer which separated was removed, washed with water, and distilled at atmospheric pressure. A 95% yield was obtained of a compound boiling at 230°–236° C. Analysis proved this material to be 3,5,5-trimethylhexanoic acid.

The condensate in the trap proved to be methyl formate. In fact, a convenient means of following the progress of the reaction is to measure the amount of methyl or ethyl formate which forms. Due to their high volatility these esters are substantially completely swept from the reaction mixture during the reaction.

The unusual role of the formic acid is brought out by the fact that, when toluene was substituted for the formic acid as a solvent in the process described above, there was no evidence whatever of reaction even after two hours. Again, when glacial acetic acid was substituted for the formic acid, there was no reaction and no organic acid was formed. Furthermore, the rate of oxidation was extremely slow and a complex mixture of products including esters was obtained when monochloroacetic or trichloroacetic acids were substituted for the formic acid or when a mole of water per mole of acetal was used in conjunction with glacial acetic acid. The yields of acids in the last three instances were, respectively, 10% in three hours, 44% in twenty hours, and 5% in four hours.

The process described herein has been used to convert a wide variety of acetals to the corresponding acids in excellent yields. The acetals, as shown above, all have the general formula

RCH(OR')$_2$ in which R' is either a methyl or an ethyl radical. The acids which are formed have the general formula RCOOH. In both of these general formulas for the acetals and acids the character R represents the same organic radical and it is apparent from what has been said that the radical R remains intact during the oxidation reaction and, therefore, is inert under the conditions which prevail during the process.

Those acetals are operable in which the group R represents an alkyl group of one to 22 carbon atoms typified by methyl, ethyl, isopropyl, n-butyl, isobutyl, tert.-butyl, sec.-amyl, octyl, lauryl, tetradecyl and octadecyl groups including the branched or isomeric forms of these groups. The acetals in which R is an unsaturated aliphatic hydrocarbon group also react in the same way as typified by those wherein R represents a propenyl, an octenyl, or an octadecenyl group. Under the conditions of the reaction the double bond is unreactive. R can also be an aryl, an aralkyl, or an aralkylene hydrocarbon group as in the acetals of benzaldehyde, phenylacetaldehyde, cinnamic aldehyde, hydrocinnamic aldehyde, hydrotropic aldehyde, and the like. Thus, it is evident that R represents a hydrocarbon group from the class consisting of alkyl, alkylene, aryl, aralkyl, and aralkylene groups.

In addition, this process works well with acetals in which the group represented by R contains an ether or an ester group. Of particular interest are those acetals which have a methoxy or ethoxy group as typified by the following:

CH$_3$CH$_2$CH$_2$CHCH$_2$CH(OCH$_3$)$_2$
|
OCH$_3$ and (CH$_3$)$_2$CCH$_2$CH(CH$_3$)CH$_2$CHCH$_2$CH(OC$_2$H$_5$)$_2$
|
OC$_2$H$_5$ Both of those ether-acetals formulated immediately above were, for example, oxidized by the method described above into ether-acids having, respectively, the following formulas:

CH$_3$CH$_2$CH$_2$CHCH$_2$COOH
|
OCH$_3$ and (CH$_3$)$_2$CCH$_2$CH(CH$_3$)CH$_2$CHCH$_2$COOH
|
OC$_2$H$_5$ This type of ether-acetal, which gives rise to ether-acids, is readily prepared, according to the process described in the Journal of the American Chemical Society, vol. 71, p. 3468 (1949), by the reaction of methyl vinyl ether or ethyl vinyl ether with acetals, made for example by the oxo process.

Likewise an ester group can be present in the radical represented by R. Such an ester group does not affect—nor is it affected by—the oxidation process of this invention. Ester-acetals which are readily oxidized to the corresponding ester-acids include all of those which are disclosed in and are made by the process of my Letters Patent No. 2,533,276 which issued December 12, 1950. They are exemplified by ethyl gamma, gammadimethoxybutyrate and methyl dimethoxymethylstearates. The resultant ester-acids are valuable because they can be converted into dicarboxylic acids and then in turn to plasticizers or alkyd resins.

As evidence of the ease with which the acetals described above can be converted to acids, attention is directed to the following illustrative examples.

Example 2

A mixture of 150 parts of 90–95% formic acid, 246 parts of the methoxy acetal of the formula (CH$_3$)$_3$CCH$_2$CH(CH$_3$)CH$_2$CH(OCH$_3$)CH$_2$CH(OCH$_3$)$_2$ and a few crystals of cobalt acetate was placed in a flask equipped with stirrer, gas-inlet tube and an outlet tube which led to a cooling trap containing a mixture of Dry Ice and acetone. Stirring was started and oxygen was passed into the mixture. The color of the mixture turned to green and the temperature rose. The temperature was maintained at 35° C. for three hours by external cooling of the reaction mixture. The reaction mixture was washed with three portions of water (100 parts each) and was then distilled. An 81% yield (175 parts) was obtained of

C$_8$H$_{17}$CH(OCH$_3$)CH$_2$COOH which boiled at 119°–122° C. at 0.3 mm. pressure. Its structure was confirmed by analysis. One hundred parts of methyl formate was recovered from the ice-trap.

Example 3

In the same way, a mixture of 177 parts of

C$_3$H$_7$CH(OCH$_3$)CH$_2$CH(OCH$_3$)$_2$ 150 parts of formic acid, and 0.5 part of cobalt acetate was reacted at 35° C. for three hours with oxygen. Seventy grams of methyl formate was recovered and 110 parts (75% yield) of

C$_3$H$_7$CH(OCH$_3$)CH$_2$COOH boiling at 74°–76° C./25 mm., was also obtained. Analysis confirmed the structure of the acid.

In contrast, no reaction occurred in over three hours when acetic acid was substituted for the formic acid in an attempt to make the methoxy acid.

Example 4

A mixture of 50 grams of formic acid, a few crystals of cobalt acetate and 50 grams of the acetal

C$_3$H$_7$CH(OCH$_3$)CH$_2$CH(OCH$_3$)CH$_2$CH(OCH$_3$)$_2$ was placed in a reactor tube equipped with a porous disc at the bottom, a recirculating sidearm, and an outlet to a Dry Ice-trap. Oxygen was admitted through the porous disc for three hours while the temperature was maintained at 30°–35° C. An 85% yield of the acid

C$_3$H$_7$CH(OCH$_3$)CH$_2$CH(OCH$_3$)CH$_2$COOH was obtained.

Example 5

The procedure of Example 4 was repeated with one exception; namely, that the ether-acetal of Example 4 was replaced by an ester-acetal of the formula $C_2H_5OOCCH_2CH_2CH(OCH_3)_2$ in the same amount. After three hours the reaction was substantially complete and an 87% yield was obtained of the ester-acid having the formula $C_2H_5OOCCH_2CH_2COOH$, which boiled at 139°–143° C./12 mm. and had an index of refraction of $N_D^{20}$, 1.433.

*Example 6*

Three hundred grams of the dimethyl acetal of propionaldehyde, 200 grams of formic acid, and one gram of cobalt acetate were charged to a reactor tube four feet in length and equipped with a porous disc at the bottom and a recirculatory side-arm which could be cooled. Air was passed through the disc into the reaction mixture for a period of four hours while the temperature was maintained at 30° C. A yield of about 90% propionic acid was obtained.

The diethyl acetals are converted to the corresponding acids in the same manner as is described above.

Thus, the process of this invention is one of converting acetals of the formula $RCH(OR')_2$ into acids of the formula RCOOH, in which formulas R is a monovalent, organic radical which is inert in that it is not reactive with free oxygen or with formic acid. In the preferred instances, R, in addition to representing a hydrocarbon radical from the class described above, represents a monovalent aliphatic radical which carries a substituent which is either a methoxy group, an ethoxy group, or an ester group, —$COOR^3$, in which $R^3$ is a monovalent hydrocarbon radical which is free of non-benzenoid or aliphatic unsaturation and which contains 1 to 12 carbon atoms, and which preferably is an alkyl group.

I claim:

1. A process for converting an acetal of the general formula $RCH(OR')_2$ into an acid of the general formula RCOOH which comprises dissolving said acetal in formic acid, passing oxygen into the resultant solution at a temperature from 0° C. to 100° C. and thereafter isolating said acid, RCOOH, the character R' in the above formula representing an alkyl group of one to two carbon atoms and the character R in both formulas representing a monovalent, inert organic radical.

2. A process for converting an acetal of the general formula $RCH(OR')_2$ into an acid of the general formula RCOOH which comprises dissolving said acetal in formic acid, passing oxygen into the resultant solution at a temperature from 5° C. to 50° C. in the presence of a dissolved organic acid salt of a heavy metal, and thereafter isolating said acid, RCOOH, the character R' in the above formula representing an alkyl group of one to two carbon atoms and the character R in both formulas representing a monovalent, inert, organic radical.

3. A process for converting an acetal of the general formula $RCH(OR')_2$ into an acid of the general formula RCOOH which comprises dissolving said acetal in formic acid, passing oxygen into the resultant solution at a temperature from 5° C. to 50° C. in the presence of a dissolved organic acid salt of a heavy metal, and thereafter isolating said acid, RCOOH, the character R' in the above formula representing an alkyl group of one to two carbon atoms and the character R in both formulas representing an alkyl group.

4. A process for converting the dimethyl acetal of 3,5,5-trimethyl hexaldehyde to 3,5,5-trimethylhexanoic acid which comprises dissolving said acetal in formic acid, passing oxygen into the resultant solution at a temperature from 5° C. to 50° C. in the presence of a dissolved organic acid salt of a heavy metal, and thereafter isolating said 3,5,5-trimethylhexanoic acid.

5. A process for converting the ether-acetal of the formula $(CH_3)_3CCH_2CH(CH_3)CH_2CH(OCH_3)CH_2CH(OCH_3)_2$ into the ether-acid of the formula $(CH_3)_3CCH_2CH(CH_3)CH_2CH(OCH_3)CH_2COOH$ which comprises dissolving said acetal in formic acid, passing oxygen into the resultant solution at a temperature from 5° C. to 50° C. in the presence of a dissolved organic acid salt of a heavy metal, and thereafter isolating said ether-acid.

6. A process for converting the ether-acetal of the formula $C_3H_7CH(OCH_3)CH_2CH(OCH_3)_2$ into the ether-acid of the formula $C_3H_7CH(OCH_3)CH_2COOH$ which comprises dissolving said acetal in formic acid, passing oxygen into the resultant solution at a temperature from 5° C. to 50° C. in the presence of a dissolved organic acid salt of a heavy metal, and thereafter isolating said ether-acid.

7. A process for converting the ether-acetal of the formula $C_3H_7CH(OCH_3)CH_2CH(OCH_3)CH_2CH(OCH_3)_2$ into the ether-acid of the formula $C_3H_7CH(OCH_3)CH_2CH(OCH_3)CH_2COOH$ which comprises dissolving said acetal in formic acid, passing oxygen into the resultant solution at a temperature from 5° C. to 50° C. in the presence of a dissolved organic acid salt of a heavy metal, and thereafter isolating said ether-acid.

8. A process for converting the ester-acetal of the formula $C_2H_5OOCCH_2CH_2CH(OCH_3)_2$ into the ester-acid of the formula $C_2H_5OOCCH_2CH_2COOH$ which comprises dissolving said acetal in formic acid, passing oxygen into the resultant solution at a temperature from 5° C. to 50° C. in the presence of a dissolved organic acid salt of a heavy metal, and thereafter isolating said ester-acid.

CHARLES H. McKEEVER.

REFERENCES CITED

The following references are of record in the file of this patent:

UNITED STATES PATENTS

| Number | Name | Date |
|---|---|---|
| 2,497,889 | Hull | Feb. 21, 1950 |

OTHER REFERENCES

Milas: Jr. Am. Chem. Soc., vol. 50, p. 496 (1928).